United States Patent [19]

Haase

[11] Patent Number: 5,799,539
[45] Date of Patent: Sep. 1, 1998

[54] MANUALLY SHIFTED AUTOMATIC TRANSMISSION LEVER

[75] Inventor: Robert Cary Haase, Southfield, Mich.

[73] Assignee: Ford Global Technologies, Inc., Dearborn, Mich.

[21] Appl. No.: 781,367

[22] Filed: Jan. 21, 1997

[51] Int. Cl.[6] ................................. F16H 59/02
[52] U.S. Cl. ................ 74/473.18; 74/335; 200/61.88
[58] Field of Search ................. 74/335, 473.18; 200/61.88, 61.91

[56] References Cited

U.S. PATENT DOCUMENTS

| | | | |
|---|---|---|---|
| 4,987,792 | 1/1991 | Mueller et al. | 74/335 X |
| 5,070,740 | 12/1991 | Giek et al. | 74/473.18 |
| 5,341,703 | 8/1994 | Palansky et al. | 477/65 |
| 5,357,820 | 10/1994 | Moroto et al. | 74/335 |
| 5,460,582 | 10/1995 | Palansky et al. | 477/138 |
| 5,509,322 | 4/1996 | Anderson et al. | 74/335 |
| 5,584,209 | 12/1996 | Issa | 74/335 |
| 5,622,079 | 4/1997 | Woeste et al. | 74/473.18 X |
| 5,682,789 | 11/1997 | DeCrouppe et al. | 74/473.18 X |
| 5,689,996 | 11/1997 | Ersoy | 74/473.18 X |

*Primary Examiner*—Allan D. Herrmann
*Attorney, Agent, or Firm*—James J. Dottavio

[57] ABSTRACT

A shift control lever assembly for an automatic transmission is provided which includes an automatic shift mode and a manual shift mode. The lever assembly comprises a first shift lane having a plurality of positions for automatic operation of the transmission and a second shift lane adjacent the first lane for manual operation of the transmission. The second shift lane includes a first position at a first end of the second lane for selecting an upshift and a second position at a second end of the second lane for selecting a downshift. A shift lever is moveable in the first and second shift lanes. First and second switches are contacted by the shift lever concurrently upon moving of the shift lever from the first shift lane into the second shift lane to command a manual operating mode. The first switch is released by the lever when the lever is moved to the first position in the second shift lane while maintaining contact with the second switch. The second switch is released when the lever is moved to the second position in the second shift lane while maintaining contact with the first switch.

6 Claims, 1 Drawing Sheet

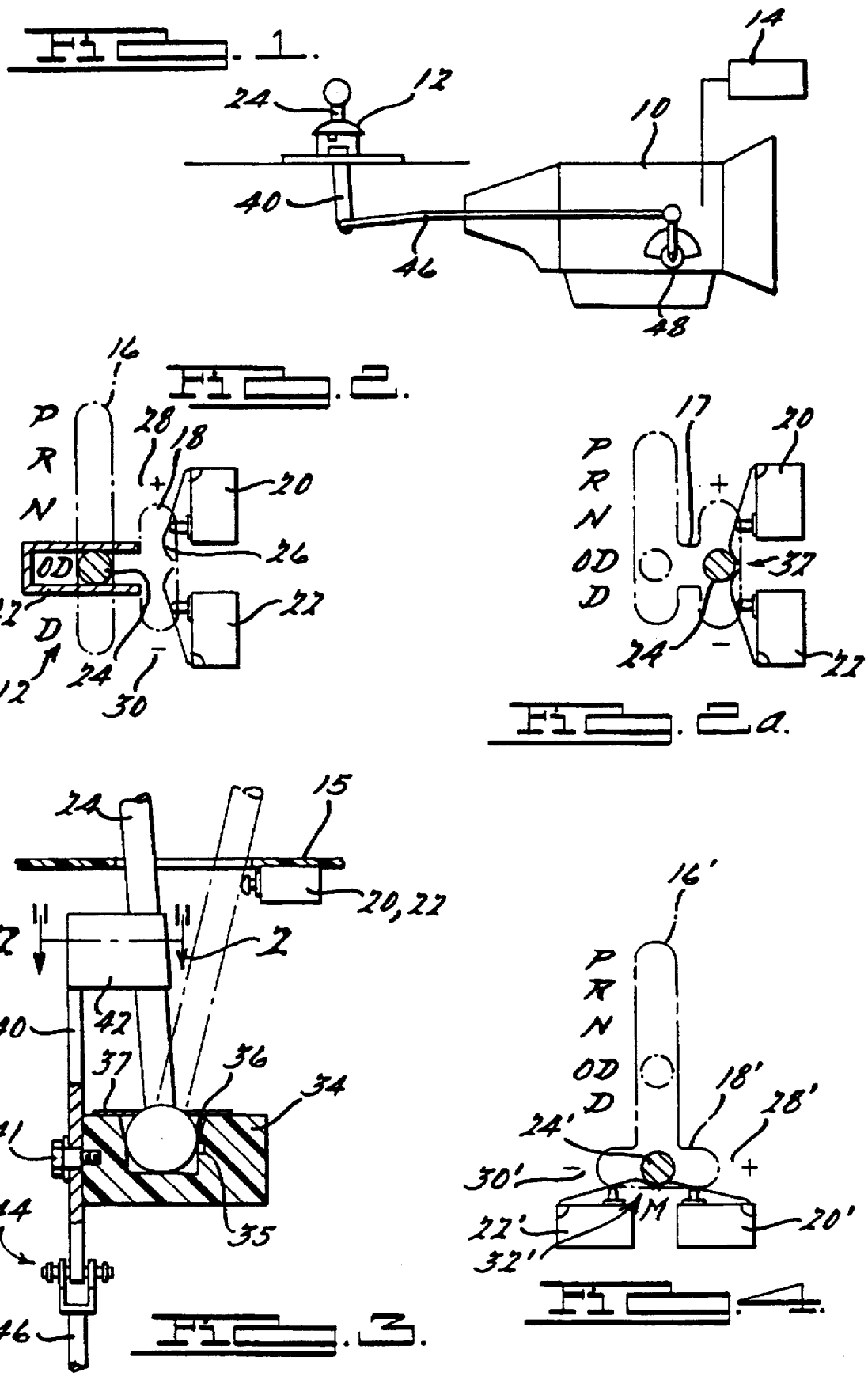

MANUALLY SHIFTED AUTOMATIC TRANSMISSION LEVER

BACKGROUND OF THE INVENTION

1. Field of the Invention

The present invention relates to an automatic transmission shift lever and more particularly to a lever for a manually shiftable automatic transmission.

2. Background of the Invention

As described in U.S. Pat. No. 5,415,056 to Tabata et al ('056 patent), a manually shiftable automatic transmission is shown. In the design shown in the '056 patent, a shift lever is pivoted in a first shifting lane to operate the automatic transmission in a conventional manner. A second shifting lane is provided adjacent the first shifting lane in which the transmission is operated in a manual mode, wherein the driver may manually select a particular gear to be engaged by positioning the lever at one of four positions corresponding with one of four selectable gears.

U.S. Pat. No. 4,987,792 to Mueller et al ('792 patent), discloses a manually shiftable automatic transmission. In the design of the '792 patent, a first lane is provided in which the shift lever operates the automatic transmission shift commands in a conventional manner. A second shift lane is provided adjacent and parallel to the first shift lane in which the gears may be selected manually by the driver. In each of the prior art patents referred to above, a first sensor is provided which detects movement from the automatic shift lane to the manual shift lane. A command in the manual shift lane to select a particular gear is detected by a second sensor. This multiplicity of sensors results in unnecessary expense and complexity in the shift lever. It would be desirable to provide a simpler shift mechanism using fewer switches.

In U.S. Pat. No. 5,509,322 to Anderson et al ('322 patent), a further shift mechanism is shown having a first shift lane which in which the transmission is operated in a conventional manner. A second shift lane is provided perpendicular to the first shift lane at one end thereof. The second shift lane provides two positions in which one of two switches is contacted to command an upshift or a downshift, respectively. The switches of the '322 patent are not used to detect movement of the lever into the Manual mode. It would be desirable to provide a simple means to detect when the lever is moved into the manual mode.

SUMMARY OF THE INVENTION

It is an object of the present invention to provide an automatic transmission lever having a conventional automatic mode as well as a manual mode using a minimum number of sensors to detect when the lever is moved into the manual mode and to detect a requested upshift or downshift in the manual mode.

An advantage of the present invention includes a more reliable assembly, since fewer components are used. Further advantages include easier assembly, lower cost, and less package space required for the fewer components.

In accordance with the objects, a shift lever assembly is provided which includes an automatic shift mode and a manual shift mode. The lever assembly comprises a first shift lane having a plurality of positions for automatic operation of the transmission and a second shift lane adjacent the first lane for manual operation of the transmission. The second shift lane includes a first position at a first end of the second lane for selecting an upshift and a second position at a second end of the second lane for selecting a downshift. A shift lever is moveable in the first and second shift lanes. First and second switches are contacted by the shift lever concurrently upon moving of the shift lever from the first shift lane into the second shift lane to command a manual operating mode. The first switch is released by the lever when the lever is moved to the first position in the second shift lane while maintaining contact with the second switch. The second switch is released when the lever is moved to the second position in the second shift lane while maintaining contact with the first switch.

BRIEF DESCRIPTION OF THE DRAWINGS

FIG. 1 is a schematic view of a transmission and shift lever according to the present invention.

FIG. 2. is a partial plan view of a transmission shift lever according to the present invention with the lever in the automatic mode;

FIG. 2a is a partial plan view of the lever shown in FIG. 1 with the lever in the manual mode;

FIG. 3. is a partial plan view of an alternative transmission shift lever according to the present invention; and FIG. 4 is a partial sectional rear view of the lever shown in FIG. 1.

DETAILED DESCRIPTION OF THE PREFERRED EMBODIMENT

In FIG. 1, an engine (not shown) is drivably connected to an automatic transmission 10. The automatic transmission 10 has an automatic shift mode in which a gear stage is set according to a running state, and a manual shift mode in which a gear stage is set on the basis of manual operation of a shift mechanism 12. A computer 14 controls the engine and automatic transmission. As is known in the art, the computer (ECU), or engine control unit, comprises a central processing unit (CPU), memory elements (ROM, RAM), and input/output interface. Further description of the components of the automatic transmission sensors and controls are described in detail in U.S. Pat. No. 5,460,582, to Palansky et al, which is assigned to the assignee of the present invention, and which is incorporated herein by reference.

As illustrated in FIGS. 2, 2a, and 3, a shift mechanism 12 according to the present invention includes a plate 15 carrying a shift pattern having a first shifting lane 16 and a second shifting lane 18. In the first shifting lane 16, the controller 14 controls the transmission 10 in an automatic manner as described in the '582 patent. In a preferred embodiment, the first shifting lane has the positions of P, R, N, OD and D. In the second shift lane 18, the driver may manually select a gear ratio by commanding an upshift or downshift.

Two sensors, or switches, 20, 22 are provided adjacent the second shift lane 18. The switches 20, 22 are contacted by the shift lever 24 of the shift mechanism when the lever 24 is moved to the second shifting lane 18. When the lever 24 is moved from the first shift lane 16, which operates the transmission in an automatic mode, into the second shift lane 18, in which the transmission is operated in a manual mode, both switches 20, 22 are contacted by the lever 24 as shown in FIG. 2a. In a preferred embodiment, the contact closes both switches 20, 22, thereby sending a signal to the controller 14, which induces the controller 14 to operate the transmission 10 in the manually actuated mode.

In a preferred embodiment, when the lever 24 is moved to the manual lane 18, the computer 14 holds the transmission 10 in the gear in which the vehicle was operating while in the automatic lane 16 until the driver requests an upshift or downshift as described below. When in the manual mode, the controller 14 preferably limits the amount of fuel delivered to the engine to prevent over-revving in the held gear ratio. Alternatively, the controller 14 may operate the transmission in a modified automatic mode when the lever 24 is in the manual lane 18, wherein the controller 14 commands the transmission 10 to change gears only when more severe operating limits are met than the limits used while the lever 24 is in the first lane 16, until an upshift or downshift is requested by the driver as described below. In such an alternative embodiment, the modified automatic mode functions in the performance mode described in U.S. Pat. No. 5,341,703 to Palansky, et al, which is incorporated herein by reference.

The driver may request an upshift manually by moving the lever 24 within the second lane in a first direction to a first end 28 of the second lane 18. When the shift lever 24 is moved to the first end 28, the rear switch 22 is released and a signal is sent to the controller 14 indicating that the switch 22 is released and the other switch 20 remains in contact with the lever 24. The controller interprets this signal as the driver requesting an upshift. In a preferred embodiment, the controller 14 determines whether the current operating conditions of the vehicle permit shifting into the next higher gear as requested. If the operating parameters do not permit the requested shift, the controller 14 will not command the shift to be performed and will hold the present gear, or alternatively, the lever 24 may be prevented from traveling to the end 28 of the second lane 18.

For purposes of this disclosure, "released" does not require that a switch 20, 22 be removed from contact with the lever 24. Release requires adequate movement of the lever 24 so the switch 20, 22 detects such movement to generate a signal to send to the controller 14 indicating release.

When the lever is moved in a second direction to the second end 30 of the second lane 18, the second switch 20 is released and the first switch 22 remains in contact with the lever 24. The controller 14 interprets these signals as the driver requesting a downshift. The controller 14 preferably determines whether such a downshift is appropriate and commands the transmission 10 to shift accordingly as described above with respect to an upshift.

After an upshift or downshift is requested as described above, the lever 24 automatically returns to a center position 32 as shown in FIG. 2a, due to a resilient connection. The resilient connection may be similar that shown in U.S. Pat. No. 5,509,322 to Anderson et al, which is incorporated herein by reference. In the center position 32, both switches 20, 22 are again contacted by the lever, thus instructing the controller 14 that the transmission 10 is to remain in the manual mode and no further action is immediately requested. The driver then may request further upshifts or downshifts by moving the lever 24 successively into the first or second positions 28, 30, respectively.

When the driver desires the transmission 10 to return to the automatic mode, the lever 24 is moved from the second shift lane 18 back to the first shift lane 16. When such movement is performed back to the first shift lane, the lever no longer contacts the two switches in the second lane. The control unit interprets the release of the switches 20, 22 when the lever is returned to the first lane 16 as a request by the driver to return the transmission 10 operation back to the automatic mode.

Accordingly, the states of the two switches 20, 22 provide the following four modes:

|  | Switch 1 (20) | Switch 2 (22) |
|---|---|---|
| AUTOMATIC MODE | OFF | OFF |
| MANUAL MODE | ON | ON |
| UPSHIFT | ON | OFF |
| DOWNSHIFT | OFF | ON |

In an alternative embodiment, the driver may move the lever repeatedly to the upshift 28 position to request an upshift to a gear ratio more than one ratio above the presently engaged ratio, or a skip shift. Such a skip shift is requested by the driver by moving the lever to the upshift position 28 a number of times corresponding to the ratio above the presently engaged ratio which equals the number of times the lever is moved to the upshift position 28. Likewise, a skip shift to a lower ratio may be requested by repeated downshift requests.

In an alternative embodiment, the controller includes a logic which interprets a request for a skip shift by the driver which is effected by the driver holding the shift lever in the second lane 18 at either extreme of travel 28, 30 for an extended period of time. For example, when the controller 14 senses the lever 24 is held in the downshift position 30 for a calibratible period of time, the controller 14 interprets this as a command for the controller 14 to find the minimum gear for the current operating conditions and the controller 14 then commands the transmission 10 to shift into this minimum gear ratio. Thus, when the controller 14 receives an upshift or downshift command for a time period which exceeds a calibratible time, the control unit 14 then selects the gear ratio for the current operating conditions which meets the desired operation commanded by the driver, depending on whether the lever 24 is held in the upshift or the downshift position 28, 30. In a preferred embodiment, the calibratible time for a skip shift is approximately three seconds.

In a preferred embodiment, the second shift lane 18 is provided parallel to the first lane 16 and connected thereto by a transverse connector lane 17, as best shown in FIG. 2a. The transverse lane 17 is preferably provided at the OD position of the first lane 16 so the manual mode is engaged from the OD position. Alternatively, one skilled in the art could provide a shift pattern which would allow the driver to access the manual mode from the D or N positions, or any other desired position using the system taught in the present disclosure.

A preferred shift mechanism is further described with reference to FIG. 3, where the lever 24 is supported by a housing in a ball-and-socket connection within a socket 34 provided in the housing. A pair of pins 35 project from the lever 24 and engage the socket 34 to prevent undesired rotation of the lever 24. The ball-and-socket connection in the socket 34 provides for fore/aft and side to side movement of the lever 24 so fore/aft movement in each lane 16, 18 is accommodated, as well as the movement between the lanes 16, 18. One skilled in the art recognizes the ball-and-socket connection could alternatively be accommodated by a universal joint connection (not shown). The lever 24 is retained in the socket 34 either by an interference fit, or by providing a plate 37 to retain the lever 24 within the socket 34.

As shown in FIG. 3, the lever 24 is shown in solid lines in the first lane 16 and in phantom lines in the second lane 18. In the first lane 16, the lever 24 engages a control arm 40 which is rotatably connected to the socket 34 using a shoulder screw 41. The control arm 40 includes an upper portion 42 having a U-shape as viewed from above in FIG. 2. The upper portion 42 captures the lever 24 when the lever 24 is in the first lane 16, as shown in FIG. 2. A second end of the control arm 40 is connected at 44 to a rod 46 which is connected to the manual valve 48 of the automatic transmission 10 which is described in the '582.

When the shift lever 24 is shifted from the first lane 16 to the second lane 18, the lever 24 exits the top portion 42 of the control arm 40 and is therefore disconnected from the manual valve 48 of the transmission 10. As the lever 24 moves in the second shift lane 18, the manual valve 48 remains in the position in which it enjoyed while the lever 24 was in the first shift lane 16. Further shifting, as requested manually by the operator in the form of upshift and downshift request, provides electronic commands to the control unit 14 due to contact by the lever 24 with the sensors 20, 22 as described above.

In an alternative embodiment, as shown in FIG. 4, the second shift lane 18' is arranged at an end of the first shift lane 16' perpendicular thereto. In the first shift lane 16', the P, R, N, OD and D positions are provided. At the end of the first lane 16' adjacent the D position, an M position 32' is provided for the manual shift mode. Adjacent the M position 32' are an upshift position 28' and a downshift position 30'. The arrangement shown in FIG. 4 operates otherwise in a manner similar that described above with reference to the arrangement shown in FIG. 2. The shift mechanism is constructed similar that described in the '322 patent, which was incorporated by reference above.

The forms of the invention shown and described herein constitute preferred embodiments of the invention; they are not intended to illustrate all possible forms thereof. The words used are words of description rather than of limitations, and various changes may be made from that which is described here without departing from the spirit and scope of the invention.

I claim:

1. A shift control lever assembly for an automatic transmission which includes an automatic shift mode and a manual shift mode, comprising:

a first shift lane having a plurality of positions for automatic operation of the transmission;

a second shift lane adjacent the first lane for manual operation of the transmission, the second shift lane including a first position at a first end of the second lane for selecting an up shift and a second position at a second end of the second lane for selecting a down shift;

a shift lever moveable in the first and second shift lanes;

first and second switches adapted to be contacted by the shift lever concurrently upon moving of the shift lever from the first shift lane into the second shift lane to command a manual operating mode, the first switch released by the lever when the lever is moved to the first position in the second shift lane while maintaining contact with the second switch and the second switch released when the lever is moved to the second position in the second shift lane while maintaining contact with the first switch.

2. A shift lever assembly according to claim 1, wherein said second shift lane is provided parallel to the first shift lane, said shift lever assembly further comprising a third shift lane provided between the first and second shift lanes, said shift lever being moveable from said first shift lane to said second shift lane through said third shift lane.

3. A shift lever assembly according to claim 2, further comprising a housing having a socket for supporting the shift lever at one end thereof for movement of the shift lever in the first and second shift lanes.

4. A shift lever assembly according to claim 3, further comprising a control lever rotatably supported by the housing, said control lever releasably connected to the shift lever when the shift lever is in the first lane and released from the shift lever when the shift lever is in the second lane.

5. A shift lever according to claim 1, wherein the second shift lane is perpendicular to the first shift lane and provided at a first end of the first shift lane.

6. A shift lever according to claim 5, wherein a skip shift may be selected by holding the shift lever in one of the group comprising the first position and the second position of the second lane for a calibratible amount of time.

* * * * *